United States Patent [19]
Wood et al.

[11] Patent Number: 5,472,012
[45] Date of Patent: Dec. 5, 1995

[54] STORAGE TANK SHUTOFF VALVE

[75] Inventors: Chester W. Wood, Cincinnati; Charles A. Sunderhaus, Hamilton; Jim E. Kesterman; Lawrence R. Blasch, both of Cincinnati, all of Ohio

[73] Assignee: Dover Corporation, New York, N.Y.

[21] Appl. No.: 182,219

[22] Filed: Jan. 14, 1994

[51] Int. Cl.⁶ .............................. F16K 31/26; F16K 33/00
[52] U.S. Cl. .......................... 137/416; 137/430; 137/446; 141/59; 141/198
[58] Field of Search ...................... 137/409, 429, 137/430, 432, 446, 377, 382, 416; 141/59, 198; 251/251, 263, 77

[56] References Cited

U.S. PATENT DOCUMENTS

| | | | |
|---|---|---|---|
| 3,770,028 | 11/1973 | Madden | 141/59 |
| 3,776,283 | 12/1973 | Kramer et al. | 141/45 |
| 4,058,148 | 11/1977 | Potter | 141/198 |
| 4,064,907 | 12/1977 | Billington et al. | 137/446 |
| 4,541,464 | 9/1985 | Christiansen | 137/446 |
| 5,010,915 | 4/1991 | Johnson et al. | 141/198 |
| 5,033,519 | 7/1991 | Puffer et al. | 141/198 |
| 5,141,019 | 8/1992 | LeBlanc et al. | 141/198 |
| 5,152,315 | 10/1992 | Lagache | 31/18 |
| 5,163,470 | 11/1992 | Maeshiba | 31/18 |
| 5,179,984 | 1/1993 | Sharp . | |
| 5,187,979 | 2/1993 | Edmark, III | 73/304 |
| 5,207,241 | 5/1993 | Babb | 31/32 |
| 5,235,999 | 8/1993 | Lindquist et al. | 31/24 |

FOREIGN PATENT DOCUMENTS

| | | | |
|---|---|---|---|
| 1142736 | 1/1963 | Germany | 137/446 |
| 605477 | 6/1960 | Italy | 137/446 |

*Primary Examiner*—George L. Walton
*Attorney, Agent, or Firm*—Dinsmore & Shohl

[57] ABSTRACT

A valve assembly for automatically shutting off the flow of a pressurized liquid to a storage tank includes a cam that is rotated in response to the level of a liquid in the storage tank. A follower moves a poppet valve axially with a housing as a nonlinear function of rate of cam rotation. The poppet valve is moved to a closed position to terminate flow of a liquid to the storage tank whenever the liquid level within the storage tank reaches a predetermined level.

18 Claims, 3 Drawing Sheets

STORAGE TANK SHUTOFF VALVE

TECHNICAL FIELD

The present invention relates generally to valves and more particularly to a shutoff valve assembly for automatically cutting off flow of a liquid to a storage tank in response to a predetermined fluid level in the storage tank. The invention will be specifically disclosed in connection with a valve assembly that is especially adapted for use with a pressurized supply line and that minimizes line shock in the fluid supply line during valve closing.

BACKGROUND OF THE INVENTION

It is very common practice to use liquid storage tanks for such fluids as gasoline, diesel fuel, and oil. These storage tanks are usually filled through openings that extend upwardly from the top of the tanks. Such openings usually have relatively small diameters that are sized to receive a dispensing tube, which dispensing tube is connected to a tank truck or other supply source. In most cases, these storage tanks do not have gauges and the operator filling the storage tank has no visual access to the internal space of the storage tank, or any other reliable way of determining when the storage tank is approaching a full level. As a consequent of these factors, overfilling of the storage tanks is a common occurrence. Such overfilling of a storage tank may result in spillage of the tank contents, damage to the tank or filling equipment, or injury to persons. Concerns over spillage of the tank contents is particularly acute when the contents are flammable, toxic, or otherwise potentially dangerous or environmentally hazardous. The problems associated with overflow spillage have become so widespread that many local governments now require some liquid storage tanks to be filled only with equipment that automatically shuts off the flow of the flow of liquid to the storage tank when the tank is full.

One way to automatically shutoff the flow of liquid to a full storage tank that has been employed in the prior art is to place a shutoff valve in the dispensing line used for supplying liquid to the storage tank. These types of shutoff valves usually employ floats that are moved by a rising liquid level in the tanks. The movement of the floats is, in turn, used to move a closure element in the shutoff valve from an open position to a closed position that stops or significantly reduces the flow of fluid through the drop tube. Examples of such shutoff valves in drop tubes are illustrated in U.S. Pat. No. 4,986,320 to Kesterman et. al. and U.S. Pat. No. 4,667,71 to Draft.

The shutoff valves described above perform very satisfactorily for underground storage tanks where the tanks are filled only under gravity pressure, which pressure is typically in the range of 4 to 5 psi. However, such shutoff valves are unsuitable when above ground storage tanks are used, or when, for any other reason, pumping pressure (not merely gravity pressure) is used to drive the fluid being introduced into the storage tanks. A typical pump used for driving liquid to an above ground storage tank delivers liquid at a pressure of approximately 50–60 psi, more than ten times the pressure encountered in gravity feed systems. Among other difficulties involved when such pumping pressure are used is the increased potential for line shock in the supply hose and related components. When a valve is closed rapidly, the flow through the valve is reduced sharply, and the pressure on the upstream side of the valve increased correspondingly. This action results in a shock wave of high pressure that is propagated upstream, applying high pressure pulses to the supply line and all of its related components. If the valve is closed sufficiently rapidly, the shock wave resulting from that closure may damage, or even rupture, the supply line and result in leakage. Because of the increased pressure conditions associated with the filling of above ground storage tanks, both from operating the valve components under the increased dynamic pressures of the fluid during the filling process and the increased line shock resulting from valve closure, shutoff valves used for underground storage tanks have generally proved to be unsuitable for use in above-ground tanks.

There have been at least two commercialized attempts in the prior art to solve the problems associated with shutoff valves for above ground storage tanks and the increased pressures involved therewith. In one of these attempts, a drop tube is provided with a shutoff valve located at its lower terminus. The valve includes circumferential outlet ports. A float is slidably fitted on the outside surface of the drop tube, and the float is interconnected to a restrictor sleeve for common movement therewith on the drop tube. As increased fluid levels occur in the storage tank, the float, and thus the restrictor sleeve, is urged upwardly. This upward movement of the restrictor sleeve positions it over the circumferential outlet ports of valve, restricting further filling of the storage tank. Among other deficiencies, this type of shutoff valve relies solely on gravity for returning the float to an open position once liquid in the storage tank is depleted. Thus, it is proned to reset failure. Moreover, this method of shutting off fluid flow inherently requires the shutoff valve to be near the bottom of the drop tube, making it prone to clog-up from solid matter that typically settles in the bottom of storage tanks. Still further, such valves do not completely shut off the flow of liquid into the storage tank.

In another less than fully successful prior art attempt to solve the above described problems, a plug valve is disposed in a drop tube. The plug valve includes a rotatable plug member that is connected by rods to a float. As the fluid level in the storage tank is increased, the float causes the connecting rods, and thus the rotatable plug, to rotate. This type of shutoff valve arrangement has the disadvantage of significantly reducing fluid flow when partially closed, and thus significantly slowing down the filling last portion of the filling process. Furthermore, this valve relies only on the weight of the float to return the valve to an open position once fluid in the storage tank is removed.

SUMMARY OF THE INVENTION

Accordingly, it is an object of the invention to provide a valve assembly suitable for shutting off the flow of a high pressure liquid that is being pumped into a storage tank in response to a predetermined liquid level in the storage tank.

It is another object of the invention to provide a valve assembly that controls the movement of a shutoff valve in a supply line furnishing liquid to a storage tank as a predetermined nonlinear function of the level of fluid in the storage tank.

Another object of the invention is to provide a valve assembly for simultaneously maximizing the flow of liquid into a storage tank and minimizing the line shock resulting from rapidly shutting off the liquid flow into the storage tank.

A still further object of the invention is to provide a valve assembly that protects a shutoff valve in a supply line to a storage tank from the dynamic forces of supply line flow.

3

Another object of the invention is to minimize the friction associated with the movement of a shutoff valve that is moved in response to a liquid level in a storage tank.

Additional objects, advantages, and other novel features of the invention will be set forth in part in the description that follows and in part will become apparent to those skilled in the art upon examination of the following or may be learned with practice of the invention. The objects and advantages of the invention may be realized and attained by means of the instrumentalities and combinations particularly pointed out in the appended claims.

To achieve the foregoing and other objects, and in accordance with the purposes herein, an improved high pressure shutoff valve for a storage tank is provided for cutting off the flow of a fluid into a storage tank or the like in response to a predetermined fluid level in the tank. The assembly includes a housing adapted for placement in a storage tank. The housing has an inlet and an outlet and an internal axial flow passage therebetween. A valve assembly is disposed in the housing. The valve assembly includes a shutoff valve movable within the housing in an axial direction between a first open position permitting the flow of fluid through said internal flow passage and a second closed position substantially blocking fluid flow through said internal passage. A guide associated with the housing is provided for guiding movement of the shutoff valve in the axial direction. An actuating assembly is interconnected to the valve assembly for moving the shutoff valve between its open and closed positions as a nonlinear function of a fluid level in a storage tank.

The assembly includes a shield disposed within the housing's internal flow passage between the inlet and the shutoff valve. This shield protects the shutoff valve from direct fluid impingement from fluid entering the internal flow passage through the housing inlet. The shield is concentrically disposed about the shutoff valve.

According to one aspect of the invention, the actuating assembly includes a float for sensing the level of a fluid in storage tank, a cam rotatable as a function of the position of the float, and a cam follower that is axially movable as a nonlinear function of the rotatable position of the cam.

In the preferred form of the invention, the shutoff valve is a poppet valve with a generally cylindrical outer sidewall, and the shield has an internal sidewall in spaced, generally parallel relationship to the outer sidewall of the shutoff valve. The space between the outer wall of the shutoff valve and the internal sidewall of the shield forms a controlled leak path from the internal axial flow passage to the relief valve.

In another aspect of the invention, a relief valve also is provided. The relief valve is resiliently biased to an open position, and is urged to a closed position in response to pressure of fluid that has passed through the controlled leak path.

According to yet another aspect of the invention, the valve stem includes an internal flow path for providing selective fluid communication between the controlled leak path and the interior of the storage tank. The relief valve is operative to selectively block fluid communication between the controlled leak path and the internal flow passage of the valve stem.

According to still another aspect of the invention, the volumetric flow capacity of the internal flow path of the valve stem is greater than the volumetric flow capacity of the controlled leak path.

The shutoff valve preferably is resiliently biased to a closed position and arranged so that downward movement of the float overcomes the shutoff valve bias and forces the shutoff valve to an open position.

In still another aspect of the invention, the housing is interposed between first and second dispensing line segments with the housing inlet being in fluid communication with the first dispensing line segment and the housing outlet being in fluid communication with the second dispensing line segment. The float is concentrically disposed about the second dispensing line segment.

In accordance with another aspect of the invention, the internal flow path of the valve stem has an inlet at the upper axial end of the valve stem and a radially extending outlet intermediate its axial ends. The guide includes a circumferential groove for receiving fluid from the internal flow path of the valve stem. The circumferential groove communicates with the interior of the storage tank at a level above the liquid level in the storage tank required to move the shutoff valve to a closed position.

BRIEF DESCRIPTION OF THE DRAWINGS

The accompanying drawings, incorporated in and forming a part of the specification, illustrate several aspects of the present invention, and together with the description, serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
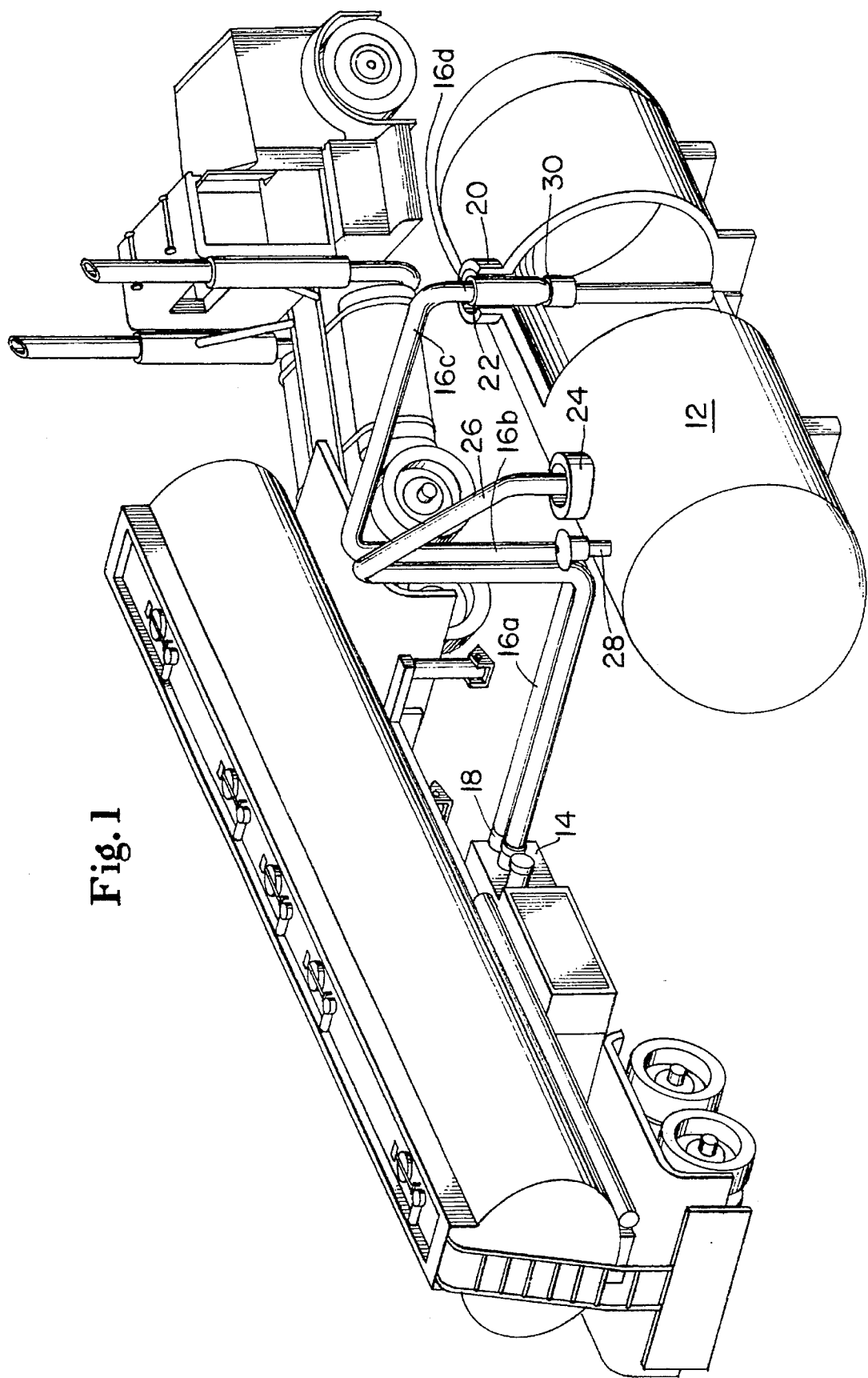
FIG. 1 is an environmental view showing an automatic shutoff valve constructed in accordance with the principles of the present invention as it is used to fill an above-ground storage tank from a tank truck.

Referring now to the drawings, FIG. 1 shows a tank truck, generally designated by the numeral 10, for transporting a flammable liquid, such as gasoline or oil, as it is parked next to an above-ground storage tank 12. The illustrated tank truck has a liquid pump 14 on its underside for pumping the tank truck's liquid contents from a first position corresponding to the height of the tank truck discharge, which is typically 18 inches to two feet off the ground, to second elevated position above the height of the storage tank 12. Depending on the type of storage tank involved, this second elevated position tank may be, in a typical situation, at a height of six feet or more above ground level.

The liquid from the tank truck 10 is pumped to the second elevated position above the storage tank 12 through a dispensing line 16. This dispensing line is connected to the pump 14 through the agency of an internally threaded coupling 18 on the end of the dispensing line, which coupling is threadably received by an externally threaded outlet nipple of the pump 14. As shown, the dispensing line 16 has a first horizontal section 16a for transporting the tank truck contents to a location adjacent to the side of the storage tank 12, a first vertical section 16b for transporting the liquid to a height above the storage tank, a second horizontal section 16c for transporting the liquid over the storage tank 12, and a second vertical section 16d for directing the liquid downwardly into the storage tank's interior.

The storage tank 12 has a first riser 20 formed by an upstanding boss that circumscribes a closable fill opening on its top side. This first riser 20 defines a fill aperture 22 adapted to receive the second vertical section 16d of the dispensing line 16. In the illustrated embodiment, the aperture 22 has a diameter of approximately 6 inches. As is well known in the art, the illustrated storage tank 12 also has a second riser 24 circumscribing a second closable opening for accommodating the entry of a vapor recovery line 26 for returning to the tank truck vapors displaced by the introduction of liquid into the storage tank 12, and a vent 28 for exhausting excess pressure from the storage tank 12.

In accordance with the principles of the present invention, the second vertical section 16d of the dispensing line 16 includes an automatic shutoff valve assembly 30 for shutting off the pressurized flow of the liquid from the tank truck 10 whenever the level of liquid in the storage tank 12 reaches a predetermined level. This automatic shutoff valve assembly 30 is shown in substantially greater detail in FIGS. 2 and 3, from which it can be seen that the shutoff valve assembly 30 of the preferred embodiment includes a housing 31 having a central section 32 with a generally cylindrical configuration. The upper portion of this central section 32 is disposed within a collar 34 that fits within the fill aperture 22 and seals the aperture against leakage of vapors. The central section of the particular valve assembly housing 31 illustrated has a diameter of approximately four inches and includes connector necks 36 and 38 of reduced diameter on its upper and lower axial ends. Each of these connector necks 36, 38 provides an axial opening to or from the internal space of the housing 31 and is internally threaded to threadably receive and interconnect with segments 16e and 16f of the second vertical dispensing line. In the specific size of valve assembly 30 illustrated in the drawings, the central portion of the housing 31 has a diameter of approximately 4 inches, with each of the illustrated dispensing line segments 16a16f having a diameter of approximately two inches. When connected to the dispensing line segments, these connector necks 36 and 38 respectively define an inlet 40 and an outlet 42 for the housing.

The housing 31 has an internal flow passage 44 that extends between the inlet and outlet. Fluid flow through this internal flow passage is controlled by a valving assembly, generally designated by the numeral 48. The valving assembly 48 includes a shutoff valve 50 that, as will be explained in greater detail later, is used to terminate flow through the internal flow passage 44 of the housing 31 when the fluid level in the storage tank 12 reaches a predetermined level. In the preferred form of the invention illustrated in FIGS. 1–3, the shutoff valve 50 takes the form of a poppet valve that moves axially within the housing 31. This poppet valve 50 has a horizontal section 50a that extends radially outwardly from a centrally disposed threaded opening 52 to an upwardly extending sidewall section of cylindrical configuration 50b. The upwardly extending sidewall section 50b of the shutoff valve 50 is concentrically positioned with respect to the generally cylindrical housing (12) sidewalls.

The illustrated shutoff valve 50 is rigidly connected at its centrally disposed opening 52 to, and moved by, a valve stem 54. The connection between the shutoff valve 50 and the valve stem 54 is achieved by providing threads on the upper axial end of the valve stem 54, and threadably interconnecting that upper axial end to the centrally disposed opening 52 of the shutoff valve 50. A stem guide 56 controls movement of the valve stem 54, and thus insures that the poppet valve 50 moves in the direction of the axis of the housing 31. The stem guide 56 is centrally supported within the internal flow passage 44 by stem guide supports 58, which stem guide supports 58 are rigidly attached to and extend radially inwardly into the center of the internal flow passage 44 from the internal sidewall of the housing 31.

Figure 2:
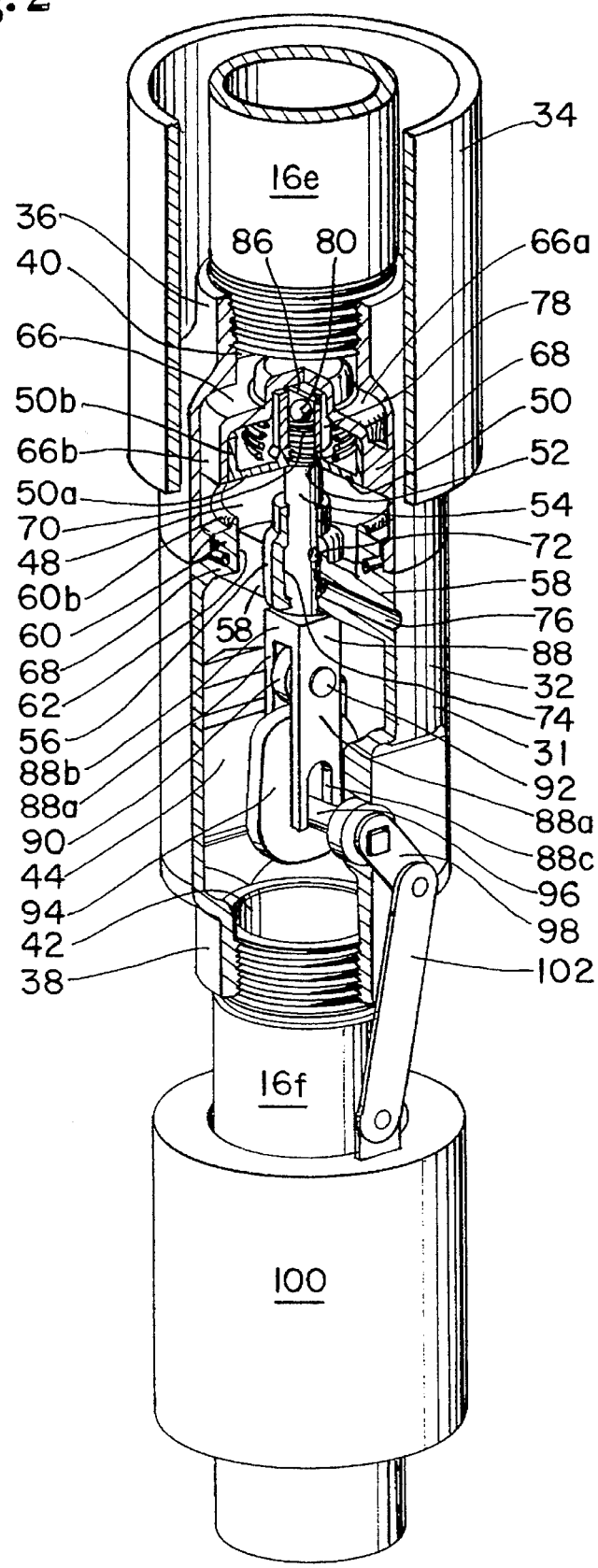
FIG. 2 is a enlarged perspective view, partially in section, depicting the automatic shutoff valve shown of FIG. 1 in a fully open position.
Figure 3:
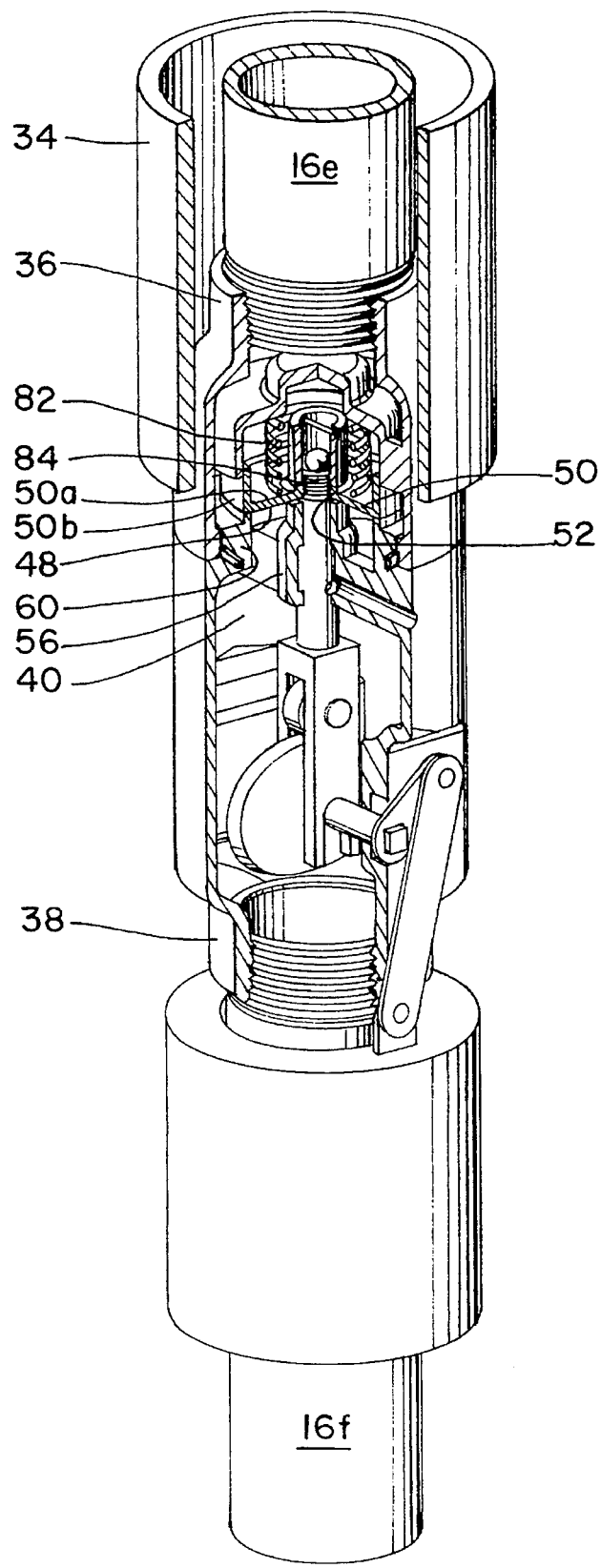
FIG. 3 is enlarged perspective view of the shutoff valve of FIG. 1, similar to the illustration of FIG. 2, but showing the shutoff valve in a closed position.

As is visually apparent from jointly viewing the illustrations of FIGS. 2 and 3, the shutoff valve 50 is movable from a first open or unseated position (illustrated in FIG. 2) in which the shutoff valve 50 permits fluid flow through the internal flow passage 44 of the housing 31 to a second closed or seated position (illustrated in FIG. 3.) in which fluid flow through the passage 44 is substantially blocked. In the second or closed position of FIG. 3, the outer periphery of the lower surface of the horizontal section 50a of the shutoff valve 50 engages and seats against a valve seat 60. As illustrated, the valve seat 60 includes a circumferential support 60a that extends radially inwardly from the internal surface of the housing 31 to define a circular aperture 62 within the housing's internal flow passage 44. A raised bead 60a extends axially upwardly from the circumferential support about the aperture 62 to form a contact surface against which the lower surface of the shutoff valve 50 seats.

According to another aspect of the invention, the shutoff valve 50 is protected from the dynamic forces of pressurized flow impingement through the housing by a cup-shaped bonnets or shield 66. This bonnet 66 has a first generally horizontal section 66a that extends radially inwardly in a plane located proximal to the housing inlet 40. The horizontal section 66a of the bonnet is joined about its entire outer periphery by an axially downwardly extending sidewall section 66b. For reasons that will be explained in greater detail below, the bonnet 66 is concentrically disposed with respect to the shutoff valve 50 to form a controlled leak path between the shutoff valve 50 and the bonnet 66. This controlled leak path is accomplished in the illustrated embodiment by positioning the downwardly extending sidewall section 66b of the bonnet in closely spaced, parallel relationship to the upwardly extending sidewall section 50b of the shutoff valve. The bonnet 66 is supported by a bridge structure 68 consisting of two supports that extend between the internal sidewall of the housing 31 and the downwardly extending sidewall 66b of the bonnet.

The valve stem 54 has an internal flow passage that extends between an inlet 70 in its upper axial end and a radially extending outlet 72 intermediate its ends. The radially extending outlet is disposed within a circumferential groove 74 in the valve stem guide 56. The circumferential groove 74 empties into a radial passageway 76 that flows outwardly through the housing 31 to the interior of the storage tank 12.

The threaded upper axial end of the valve stem 54 also is threadably connected to a check ball retainer sleeve 78, which check ball retainer sleeve 78 has a tubular configuration with an internally threaded lower portion. This lower portion of the check ball retainer sleeve 78 is screwed onto the upper axial of the valve stem 54 on top of the poppet valve 50. A check ball 80 is retained in the check ball retainer for selectively seating against the axial upper end of the valve stem 54 and blocking liquid flow into the valve stem's internal passageway. The check ball 80 is movable between a first open position, depicted in FIG. 2, in which liquid flow into the axial end of the valve stem 54 is permitted, to a second closed position, depicted in FIG. 3, in which the check ball 80 blocks liquid flow into the passageway. A first compression spring 82 extending between the lower planar surface of the bonnet 60 and the upper planar surface of the poppet valve 50 is concentrically disposed about the check ball retainer sleeve 78 to urge the check ball 80 to the first or open position. A second compression spring 84 is disposed within the check ball retaining sleeve 78 to urge the check ball 80 to its first or open position. A retaining pin 6 extends across the upper opening of the check ball retaining sleeve 78 to maintain the check ball 80 within the retaining sleeve 78.

The lower axial end of the valve stem 54 is attached to a yoke 88. As depicted in the drawings of FIGS. 2 and 3, the yoke 88 includes a pair of downwardly depending arms 88*a* that are joined at their upper axial ends by a cross piece 88*b*. The arms support 88*a* a roller or cam follower 90 that is positioned between, and rotatably connected to, each of the two arms 88*a* by a shaft 92. The roller 90 rides upon and follows the profile of a cam 94 which is rigidly attached to a rotatable shaft 96. The lower ends of each of the yoke arms 88*a* have an open-ended elongated "U-shaped" groove 88*c* that is fitted about the rotatable shaft 96. As will be apparent to those skilled in the art from comparing the illustrations of FIGS. 2 and 3, these openended "U-shaped" grooves 88*a* allow the yoke 88 to be freely movable with respect to the rotatable shaft 96 in the vertical direction, while restricting relative movement between these two components 88 and 96 in all other directions.

The shaft 96 of the cam 94 extends through opposite sides of the 5housing 31 sidewall and is rotatably supported by the housing 31. Crankshafts 98 (only one of which is shown) are connected to the shaft 96 outside of the housing 31. These crankshafts 98 are pivotally joined to a tubular shaped float 100 by connecting links 102 (again, only one of which is illustrated). The float 100 is in concentrically disposed spaced relationship to, and slidably movable on, the lower segment 164 of the dispensing line. By virtue of these interconnections between the float 100 and the crankshafts 98, vertical movement of the float, which is effectuated by changes in the liquid level in the storage tank 12, is translated into rotational movement of the shaft 96.

In operation, when filling a storage tank 12, the shutoff valve 50 assembly is normally in the open position depicted in FIG. 2 during the initial of a filling operation, with liquid level in the tank being below the float 100. In this position of the shutoff valve 50, pressurized liquid flow exits the dispensing line segment 16*e* and is introduced into the inlet 40 of the valve assembly housing 31. After impinging the bonnet 66, the liquid is deflected radially outwardly about the downwardly depending sidewall section 66*b* of the bonnet and most of the liquid passes into the opening between the shutoff valve 35 and the seat 60. The liquid passing through this opening then flows through the internal flow passage 44 of the housing 31, through the outlet 42, and into the dispensing line segment 16*f*. In addition to the flow passing through the opening between the shutoff valve 35 and the seat 60, a small amount of flow passes in the space between the..respective axial sidewall sections 50*b*, 66*b* of the shutoff valve 50 and the bonnet 66, over the top of the check ball retaining sleeve 78, and into the internal flow passage of the valve stem 54. In order to insure that flow through the valve stem's internal passage does not create a back pressure in the area above the shutoff valve 50, the volumetric flow capacity valve stem passage is greater than volumetric capacity of the controlled leakage space between the respective sidewall sections 50*b*, 66*b* of the shutoff valve and the bonnet.

As the liquid level within the storage tank 12 increases, it eventually reaches the level of the float 100. When the liquid level increases further, the resulting buoyant force applied against the float 100 urges the float upwardly. This upward movement of the float 100, by virtue of the interconnections between the float, connecting link and crankshaft described above, causes counter-rotation (as viewed from FIGS. 2 and 3) of the cam 94. In the preferred embodiment, the first sector of the cam profile forms an arc with the axis of the shaft 96 as the center point. Consequently, the initial rotation of the cam 94 does not effectuate movement of the yoke 88, or of the shutoff valve 50. This non-movement of the shutoff valve 50 achieves several objectives. First, it initially maintains the shutoff valve 50 in a fully open position to maximize liquid flow through the valve assembly. Secondly, and perhaps even more importantly, it insures that the initial line of force between the cam 94 and the roller 90 passes through the axis of the crank 98. This avoids the possibility that lateral forces will be initially be applied against the roller 90 and cause it to override the cam 94.

As the cam 94 is rotated further, the following sectors of the cam profile are nonarcuate and of decreasing distance from the axis of the shaft 96. As suggested from the depiction of FIG. 3, this further cam rotation allows the roller 90, and thus the yoke 88, valve stem 54 and shutoff valve 50, to move axially downwardly. Such downward movement results from downward forces applied against the shutoff valve 50 from both the compression spring 52 and the pressure of the liquid above the shutoff valve 50.

As downward movement of the shut off valve 50 continues with continued upward movement of the float 100, the shutoff valve 50 advances toward the seated position depicted in FIG. 3. When the shutoff valve 50 approaches the seated position of FIG. 3, and the restriction between the shutoff valve 50 and the seat 66 becomes more severe, the resulting back pressure causes increased flow into the controlled leak path between the axially extending sidewalls 66*b*, 50*b* of the bonnet and shutoff valve. This increased flow exerts a corresponding increasing force against the check ball 80. Eventually this force increases to the level that it forces downward movement of the check ball 80 against the resilient force of the compression spring 84. Preferably, the compression spring 84 is match to the sizes of the valve assembly components and flow rates to effectuate closure of the check ball 80 immediately after the closure of the shutoff valve 50. Timing of the shutoff valve 50 and check ball 80 in this manner further facilitates the minimization of line shock from shutting off the flow of liquid in the dispensing line.

In summary, numerous benefits have described which results from employing the concepts of the invention. The disclosed shutoff valve assembly protects the shutoff valve from dynamic flow pressure, operates effectively under conditions of pressurized dispensing line flow, and is highly effective in minimizing line shock that typically results from shutting off the flow of a pressured flow of liquid into a storage tank. The disclosed shutoff valve assembly advantageously controls the movement of the shutoff valve as a nonlinear function of the liquid level in the storage tank and provides a pressure assisted closure of the shutoff valve. It also minimizes the friction required to move the shutoff valve between open and closed positions and provides a valve assembly that resets to an open position when the liquid level in the storage tank falls below a predetermined level. The disclosed shutoff valve assembly also advantageously bleeds off any leakage at shutoff in the ullage above the liquid level in the storage tank, thus eliminating the possibility of siphoning of the liquid out of the tank.

The foregoing description of a preferred embodiment of the invention has been presented for purposes of illustration and description. It has not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill to best utilize the invention in various embodiments and with various modifications as are suited to the particular use contemplated. It is intended that the scope of the invention be defined by the claims appended hereto.

We claim:

1. An assembly adapted for cutting off the flow of a fluid into a storage tank or the like in response to a predetermined fluid level in the tank, comprising:

a) a housing, said housing having an inlet and an outlet and an internal axial flow passage-therebetween, said housing being adapted for placement in a storage tank;

b) a valve assembly disposed in said housing, said valve assembly including a shutoff valve movable within said housing in an axial direction between a first open position permitting the flow of fluid through said internal flow passage and a second closed position substantially blocking fluid flow through said internal passage;

c) a guide associated with said housing for guiding movement of the shutoff valve in axial direction in said housing;

d) an actuating assembly, said actuating assembly being interconnected to said valve assembly for moving said shutoff valve between said open and closed positions as a function of a fluid level in a storage tank; and e) a shield stationarily secured in the internal flow passage between the inlet and the shutoff valve, the shield including a radially extending portion for shielding the shutoff valve from direct fluid impingement from fluid entering the internal flow passage through the housing inlet and an axially extending portion, the axially extending portion defining a space and the shutoff valve being movable into the space defined by the axially extending portion of the shield.

2. An assembly as recited in claim 1 further including a shield disposed within said housing in the internal flow passage between the inlet and the shutoff valve for shielding the shutoff valve from dire& fluid impingement from fluid entering the internal flow passage through the housing inlet.

3. An assembly as recited in claim 2 wherein the shield is concentrically disposed about the shutoff valve.

4. An assembly as recited in claim 3 wherein the shutoff valve is a poppet valve with a generally cylindrical outer sidewall, and the shield has an internal sidewall in spaced, generally parallel relationship to the outer sidewall of the shutoff valve.

5. An assembly as recited in claim 4 wherein poppet valve is axially movable within the shield.

6. An assembly as recited in claim 5 wherein the valve assembly further includes a relief valve.

7. An assembly as recited in claim 5 wherein the space between the outer wall of the shutoff valve and the internal sidewall of the shield forms a controlled leak path from the internal axial flow passage to the relief valve.

8. An assembly as recited in claim 7 wherein the relief valve is resiliently biased to an open position, and is urged to a closed position in response to pressure of fluid that has passed through the controlled leak path.

9. An assembly as recited in claim 8 further including a valve stem, the valve stem being slidably disposed within the guide and being rigidly connected to the poppet valve for common movement therewith.

10. An assembly as recited in claim 9 further including a yoke rigidly connected to the valve stem, the cam follower being rotatably supported in the yoke.

11. An assembly as recited in claim 10 wherein the valve stem includes an internal flow path for providing selective fluid communication between the controlled leak path and the interior of the storage tank, and wherein the relief valve is operative to selectively block fluid communication between the controlled leak path and the internal flow passage of the valve stem.

12. An assembly as recited in claim 11 wherein the volumetric flow capacity of the internal flow path of the valve stem is greater than the volumetric flow capacity of the controlled leak path.

13. An assembly as recited in claim 9 wherein the internal flow path of the valve stem has an inlet at the upper axial end of the valve stem and a radially extending outlet intermediate its axial ends, and wherein the guide includes a circumferential groove for receiving fluid from the internal flow path of the valve stem.

14. An assembly as recited in claim 13 wherein the circumferential groove communicates with the interior of the storage tank at a level above the liquid level in the storage tank required to move the shutoff valve to a closed position.

15. An assembly as recited in claim 1 wherein the actuating assembly further includes a float for sensing the level of a fluid in storage tank, a cam rotatable as a function of the position of the float, and a cam follower movable as a nonlinear function of the position of the float.

16. An assembly as recited in claim 15 wherein the shutoff valve is resiliently biased to a closed position and wherein downward movement of the float overcomes the shutoff valve bias and forces the shutoff valve to an open position.

17. An assembly as recited in claim 15 wherein the housing is interposed between first and second dispensing line segments with the housing inlet being in fluid communication with the first dispensing line segment and the housing outlet being in fluid communication with the second dispensing line segment, and wherein the float is concentrically disposed about the second dispensing line segment.

18. In combination with an above ground storage tank, an assembly for substantially terminating flow of a fluid to the storage tank in response to a predetermined fluid level in the tank, the assembly comprising:

a) a housing disposed in said fluid tank, said housing having an inlet and an outlet and an internal axial flow passage therebetween;

b) a valve assembly disposed in said housing, said valve assembly including a shutoff valve moveable within said housing in an axial direction between a first open position permitting the flow of fluid through said internal flow passage and a second closed position substantially blocking fluid flow through said internal passage;

c) a guide associated with said housing for guiding movement of the shutoff valve in an axial direction and said housing;

d) an actuating assembly, said actuating assembly being interconnected to said valve assembly from moving said shutoff valve between said open and closed positions as a function of a fluid level in the storage tank; and e) a shield stationarily secured in the internal flow passage between the inlet and the shutoff valve, the shield including a radially extending portion for shielding the shutoff valve from direct fluid impingement from fluid entering the internal flow passage through the housing inlet and an axially extending portion, the axially extending portion defining a space and the shutoff valve being movable into the space defined by the axially extending portion of the shield.

* * * * *

UNITED STATES PATENT AND TRADEMARK OFFICE
CERTIFICATE OF CORRECTION

PATENT NO. : 5,472,012

DATED : Dec. 5, 1995

INVENTOR(S) : Chester W. Wood, et al.

It is certified that error appears in the above-identified patent and that said Letters Patent is hereby corrected as shown below:

Column 9, line 44 (claim 2) delete "direc&" and insert in place thereof --direct--.

Signed and Sealed this

Ninth Day of April, 1996

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,472,012
DATED : Dec. 5, 1995
INVENTOR(S) : Wood, et al.

It is certified that error appears in the above-identified patent and that said Letters Patent is hereby corrected as shown below:

Column 6, line 18, please delete "60a".
Column 6, line 21, please delete "60a" and insert therefor --60b--.
Column 7, lines 2 to 3, please delete "to urge the check ball 80 to the first or open position".
Column 7, line 6, please delete "6" and insert therefor --86--.
Column 7, line 27, please delete "5housing" and insert therefor --housing--.
Column 8, line 25, please delete "52" and insert therefor --82--.
Column 8, line 40, please delete "match" and insert therefor --matched--.

Column 9, lines 41-45, please cancel claim 2.
Column 9, line 46, (claim 3, line 1), please delete "2" and insert therefor --1--.

Column 10, line 3, (claim 10, line 2), please delete "the cam" and insert therefor --and a cam--
Column 10, line 61, (claim 18, line 18), in subparagraph (d), please delete "from" and insert therefor --for--.

Signed and Sealed this

Twenty-seventh Day of January, 1998

Attest:

Attesting Officer

BRUCE LEHMAN

Commissioner of Patents and Trademarks